US006873710B1

(12) United States Patent
Cohen-Solal et al.

(10) Patent No.: US 6,873,710 B1
(45) Date of Patent: Mar. 29, 2005

(54) METHOD AND APPARATUS FOR TUNING CONTENT OF INFORMATION PRESENTED TO AN AUDIENCE

(75) Inventors: Eric Cohen-Solal, Ossining, NY (US); Damian M. Lyons, Putnam Valley, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 531 days.

(21) Appl. No.: 09/603,532

(22) Filed: Jun. 27, 2000

(51) Int. Cl.$^7$ ................................................ G06K 9/00

(52) U.S. Cl. ...................................... 382/100; 382/181

(58) Field of Search ................................. 382/100, 181, 382/115; 725/9, 10, 12

(56) References Cited

U.S. PATENT DOCUMENTS

| 4,769,697 A | * | 9/1988 | Gilley et al. ................... 725/12 |
| 4,858,000 A | * | 8/1989 | Lu .............................. 725/12 |
| 5,550,928 A | * | 8/1996 | Lu et al. ....................... 382/116 |
| 5,781,650 A | | 7/1998 | Lobo et al. .................. 382/118 |
| 5,959,717 A | | 9/1999 | Chaum |
| 6,408,278 B1 | * | 6/2002 | Carney et al. ................. 705/14 |
| 2002/0078441 A1 | * | 6/2002 | Drake et al. .................... 725/9 |

FOREIGN PATENT DOCUMENTS

| EP | 0578558 A1 | 1/1994 | ........... G06F/15/70 |
| EP | 0927985 A2 | 7/1999 | ........... G09F/27/00 |
| GB | 2146821 A | 4/1985 | ........... G09F/27/00 |
| GB | 2240233 A | 7/1991 | ............ H04N/7/18 |
| GB | 2240233 | 7/1991 | ............ H04N/7/18 |
| GB | 2269670 A | * | 2/1994 | ........... G07C/13/00 |

OTHER PUBLICATIONS

Moghaddam et al., "Gender Classification with Support Vector Machines", IEEE Transactions on Pattern Analysis and Machine Intelligence, pp. 711–720, 1997.

Criminsl et al., "A New Approach to Obtain Height Measurements form Video", Proc. Of SPIE, Bostaon, MA, vol. 3576, Nov. 1998.

Lyons et al., "A Line–Scan Computer Vision Algorithm for Identifying Human Body Features", Gesture '99, pp. 85–96, France 1999.

Yang et al., "Detecting Human Faces in Color Images", Proc. Of 1998 IEEE Int'l Conference on Image Processing (ICIP) 98, vol. 1, pp. 127–130, Oct. 1998.

Haritaoglu et al., "Hydra: Multiple People Detection and Tracking Using Silhouettes", Computer Vision and Pattern Recognition, Second Workshop of, Video Surveillance CVPR, 1999.

(Continued)

Primary Examiner—Jon Chang
(74) Attorney, Agent, or Firm—Gregory L. Thorne

(57) ABSTRACT

A method and apparatus are disclosed for tuning the content of information presented to an audience, for example, on a large display screen or an information kiosk. A disclosed content selection and driving system (i) extracts relevant characteristics about the audience, (ii) analyzes the characteristics, (iii) modifies the presented content based on the analysis, and (iv) records relevant statistics for reporting. An audio/visual analyzer derives audience characteristics and other information on the public reaction to the presented advertising or information by analyzing audio or video information, or both. The derived characteristics are utilized to tune the content of the presented advertising or information to the characteristics of the current audience. A reporting module receives real-time audience statistics and an indication of the selected content. Reports can be generated for the content provider, such as advertisers, that indicate the exposure of various population segments to the presented content and the reaction of the audience to the presented content.

12 Claims, 7 Drawing Sheets

OTHER PUBLICATIONS

Cohn et al., "Bimodal Expression of Emotion by Face and Voice", Workshop on Face/Gesture Recognition and Their Applications, 6$^{th}$ ACM Int'l Multimedia Conference, Sep. 1998.

Baker et al., "Hallucinating Faces", 4$^{th}$ Int'l Conference on Automatic Face and Gesture Recognition, Mar. 2000.

Colmenarez et al., "Embedded Face and Facial Expression Recognition", Int'l Conference on Image Processing, Japan 1999.

Iwasawa et al., "Real Time 3D Estimation of Human Body Postures from Trinocular Images", ICCV'99, Workshop on Modeling People, Corfu Greece 1999.

\* cited by examiner

CONTENT DATABASE 400

| | CONTENT IDENTIFIER | BRIEF DESCRIPTION | TARGET AUDIENCE | LENGTH |
|---|---|---|---|---|
| 405 | AD1 | CANADIAN TOURISM BOARD AD | CANADIAN TOURISTS | 5 MINUTES |
| 410 | NEWS2 | SPORTS UPDATE | MEN | 30 MINUTES |
| 415 | AD6 | RESTAURANT ADVERTISEMENT | GENERAL | 30 SECONDS |
| • • • • | | | | |
| 420 | AD5 | TOY STORE AD | CHILDREN | 1 MINUTE |

CONTENT EVALUATION REPORT-1000

CONTENT: AD1

CONTENT PROVIDER: CANADIAN TOURISM BOARD

|  |  | 1051 | 1052 | 1053 |
|---|---|---|---|---|
|  |  | 0 TO T | T TO 2T | 2T TO 3T |
| 1005 | NUMBER OF PEOPLE IN AUDIENCE | 40 |  |  |
| 1006 | NUMBER OF PEOPLE ARRIVING DURING PRESENTATION | 10 |  |  |
| 1007 | NUMBER OF PEOPLE LEAVING DURING PRESENTATION | 5 |  |  |
| 1008 | TURNOVER RATE |  |  |  |
| 1009 | PERCENTAGE MALE/FEMALE |  |  |  |
| 1010 | PERCENTAGE ADULT/CHILDREN |  |  |  |
| 1011 | PERCENTAGE FACING DISPLAY |  |  |  |
| 1012 | PERCENTAGE CHANGING FACIAL EXPRESSION |  |  |  |
| 1013 | PERCENTAGE CHANGING BODY POSTURE |  |  |  |

FIG. 10

METHOD AND APPARATUS FOR TUNING CONTENT OF INFORMATION PRESENTED TO AN AUDIENCE

FIELD OF THE INVENTION

The present invention relates to a method and apparatus for presenting information to an audience, and more particularly, to a method and apparatus for tuning the content of information that is presented, for example, on a large display screen or an information kiosk, to an audience.

BACKGROUND OF THE INVENTION

The impact of advertising and other presented information can be significantly increased if the content can be adapted to a given target audience. The success of any advertising campaign, for example, requires that the advertisements reach the target audience. Generally, a particular advertising or informative message is targeted for one or more segments of a population, with media planners determining the best way to reach the target audience.

Typically, prior to executing an advertising campaign, media planners attempt to predict the best media options to reach a target audience. In addition, during a given advertising campaign, it is helpful to measure the exposure of the target audience to the advertising messages, since media planners might make corrections in order to optimize the implementation of the media plan. Likewise, after a given advertising campaign, media planners often analyze the advertising campaign to confirm that the advertising messages reached the target audience.

While the audience demographics associated with most media vehicles are well defined, the dynamic nature of some media vehicles makes predicting the audience demographics in advance difficult, if not impossible. For example, large screen displays, such as information kiosks, are often utilized in public places to present advertisements and other information to people passing by the displays. Typically, the content that is presented to the public on such a display is generally suitable for the location where the display is installed. For example, airports and other transportation terminals often use such displays to present schedules and other information of interest to passengers.

Thus, tailoring the content to such a dynamic audience is difficult. While such displays and information kiosks have been effective for presenting general information to large audiences, they suffer from a number of limitations, which if overcome, could greatly expand their utility and effectiveness. Specifically, since the demographics of the audience in such public places cannot be accurately predicted in advance, any presented content must generally appeal to the population at large.

A need therefore exists for a method and apparatus for automatically evaluating the demographics of an audience in real-time and for tuning the content of information that is presented on a large display screen or an information kiosk to the current audience. A further need exists for a method and apparatus for evaluating the reaction of an audience to presented content in real-time. Yet another need exists for a method and apparatus for estimating the size of an audience in real-time. Finally, a need exists for a method and apparatus for generating reports on the exposure of various population segments to presented content. In this manner, the reports provide a feedback mechanism that allows the content providers and advertisers to reach the target audience in an efficient manner.

SUMMARY OF THE INVENTION

Generally, a method and apparatus are disclosed for tuning the content of information presented, for example, on a large display screen or an information kiosk, to an audience. A disclosed content selection and driving system (i) extracts relevant characteristics about the audience, (ii) analyzes the characteristics, (iii) modifies the presented content based on the analysis, and (iv) records relevant statistics for reporting.

The content selection and driving system evaluates the impact of advertising or information displayed on the display. An audio/visual analyzer derives audience characteristics and other information on the public reaction to the presented advertising or information by analyzing audio or video information, or both. In one illustrative embodiment, the audio/visual analyzer can derive (i) various demographic statistics, including gender, race or age statistics; (ii) the current size of the audience; (iii) how quickly the audience is changing; and (iv) how much attention the audience is paying to the presented advertising or information.

The derived characteristics are utilized by a dynamic content selector to tune the content of the presented advertising or information to the characteristics of the current audience. The dynamic content selector utilizes the derived audience statistics, and optionally offline statistics about the local environment, to select the appropriate content for the current audience from a content database.

A reporting module is disclosed that receives the real-time audience statistics from the audio/visual analyzer and an indication of the selected content from the dynamic content selector. Reports can be generated for the content provider, such as advertisers, that indicate the exposure of various population segments to the presented content and the reaction of the audience to the presented content, thereby providing a feedback mechanism that allows the content providers and advertisers to effectively reach the target audience.

A more complete understanding of the present invention, as well as further features and advantages of the present invention, will be obtained by reference to the following detailed description and drawings.

BRIEF DESCRIPTION OF THE DRAWINGS

FIG. 10 illustrates an exemplary report generated in accordance with the present invention indicating the exposure of various population segments to the presented content and the reaction of the audience to the presented content.

DETAILED DESCRIPTION

Figure 1:
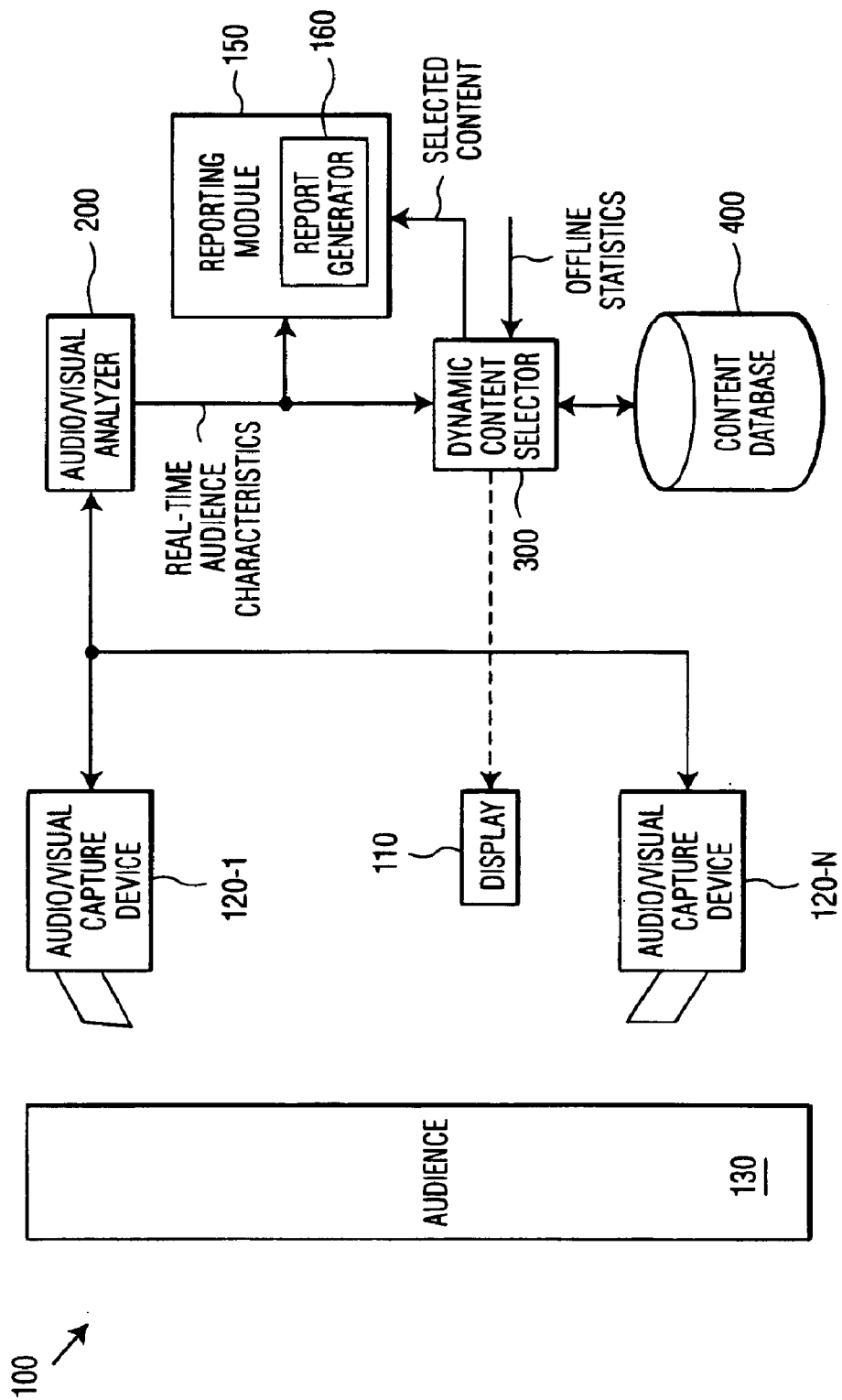
FIG. 1 illustrates a content selection and driving system in accordance with the present invention.

FIG. 1 illustrates a content selection and driving system 100 in accordance with the present invention. Generally, the content selection and driving system 100 (i) extracts relevant characteristics about the audience, (ii) analyzes the characteristics, (iii) modifies the presented content based on the analysis, and (iv) records relevant statistics for reporting.

As shown in FIG. 1, one or more audio/visual capture devices 120-1 through 120-N (hereinafter, collectively referred to as audio/visual capture devices 120) are focused on, an audience 130 that is viewing a display 110, such as a large screen display or an information kiosk. In one embodiment, the display 110 may be embodied as the Access Point$^4$/ information kiosk, commercially available from Philips Electronics, N.A. Typically, the display 110 may be installed in a public place, such as an airport, transportation terminal, shopping mall, museum or the like. The audio/visual capture devices 120 may include, for example, a pan-tilt-zoom (PTZ) camera for capturing video information or an array of microphones for capturing audio information, or both.

It is noted that the composition of the audience 130 may vary over time, depending, at least in part, on the nature of the location where the display 110 is installed. One feature of the present invention, discussed below in conjunction with FIG. 7, evaluates the rate of change of the audience 130. In this manner, if the audience is not changing quickly, the content selection and driving system 100 can select longer advertising messages or programs, or more detailed information. If the content selection and driving system 100 determines that the audience is moving and changing more quickly over time, shorter advertising messages or programs, or less detailed information, can be presented.

The content selection and driving system 100 evaluates the impact of advertising or information displayed on the display 110. As shown in FIG. 1, the content selection and driving system 100 includes a audio/visual analyzer 200, discussed below in conjunction with FIG. 2, that derives audience characteristics and other information on the public reaction to the presented advertising or information by analyzing audio or video information, or both. As discussed further below in conjunction with FIGS. 5 through 8, the audio/visual analyzer 200 can extract various types of information about the audience from the audio or video information, or both. In the illustrative embodiment, the audio/visual analyzer 200 can derive (i) various demographic statistics, including gender, race or age statistics; (ii) the current size of the audience; (iii) how quickly the audience is changing; and (iv) how much attention the audience is paying to the presented advertising or information.

The derived characteristics could be utilized by a dynamic content selector 300, discussed below in conjunction with FIG. 3, to tune the content of the presented advertising or information to the characteristics of the current audience. For example, the content selection and driving system 100 may store two versions of an advertisement for a given product, with one version targeting men and the second version targeting women. The content selection and driving system 100 can dynamically select one version over the other based on a dynamic determination of the current gender composition of the audience 130. As shown generally in FIG. 1, and discussed further below, the dynamic content selector 300 utilizes the derived audience statistics and offline statistics about the local environment, such as historical audience demographics, or flight or train schedules, to select the appropriate content for the current audience from a content database 400.

In addition, the content selection and driving system 100 includes a reporting module 150 that receives the real-time audience statistics from the audio/visual analyzer 200 and, an indication of the selected content from the dynamic content selector 300. The reporting module 150 includes a report generator 160 that produces reports, discussed further below in conjunction with FIG. 10, for the content provider, such as advertisers. Generally, the reports indicate the exposure of various population segments to the presented content and the reaction of the audience to the presented content, thereby providing a feedback mechanism that allows the content providers and advertisers to effectively reach the target audience. For example, the reports produced by the report module 150 can indicate the size and rate of change of the audience, as well as various demographics of the audience, such as age, race, or gender. As discussed further below in conjunction with FIG. 2, these audience statistics are generated by the audio/visual analyzer 200.

Figure 2:
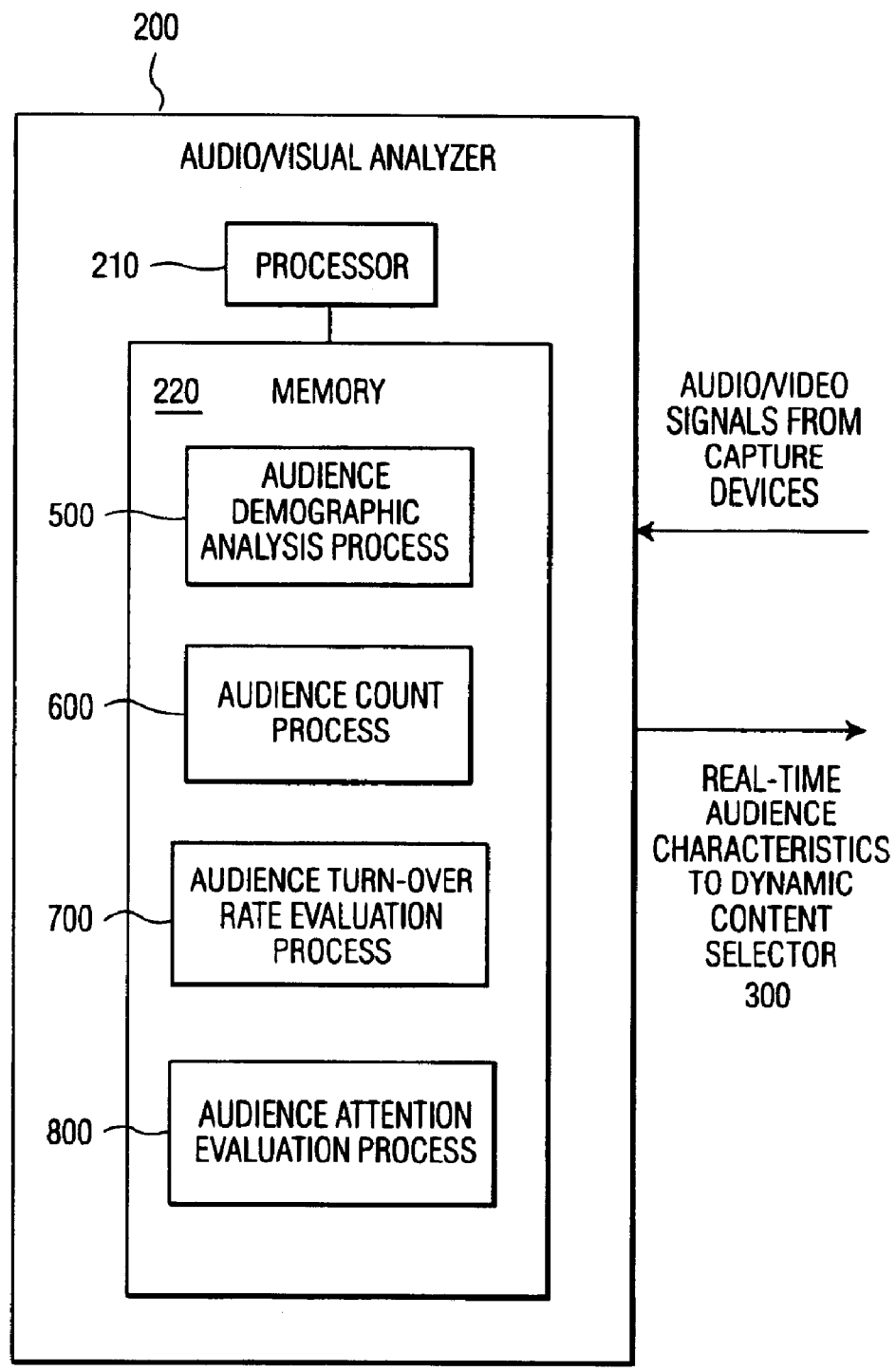
FIG. 2 is a schematic block diagram of the audio/visual analyzer of FIG. 1.

FIG. 2 is a block diagram showing the architecture of an illustrative audio/visual analyzer 200 in accordance with the present invention. The audio/visual analyzer 200 may be embodied as a general purpose computing system, such as the general purpose computing system shown in FIG. 2. As shown in FIG. 2, the audio/visual analyzer 200 preferably includes a processor 210 and related memory, such as a data storage device 220, which may be distributed or local. The processor 210 may be embodied as a single processor, or a number of local or distributed processors operating in parallel. The data storage device 220 and/or a read only memory (ROM) (not shown) are operable to store one or more instructions, which the processor 210 is operable to retrieve, interpret and execute. The audio/visual analyzer 200 receives audio or video signals, or both, from the audio/visual capture devices 120. The audience characteristics derived by the audio/visual analyzer 200 from the audio/video information is presented to the dynamic content selector 300 for further processing.

As discussed further below in conjunction with FIGS. 5 through 8, the data storage device 220 includes an audience demographic analysis: process 500, an audience count process 600, an audience turn-over evaluation process 700 and an audience attention evaluation process 800. Generally, the audience demographic analysis process 500 evaluates facial and body features of the audience to segment the audience based on one or more desired demographics, such as age, race, or gender. The audience count process 600 analyzes the video image to identify distinctive human features, such as a body, head and facial feature hierarchy, and then counts the individuals in the image to estimate the size of the audience. The audience turn-over evaluation process 700 generates an evaluation of how quickly the audience is changing. The audience attention evaluation process 800 evaluates the audio or video information, or both, to identify behavior that suggests whether or not the audience is paying attention to the presented advertising or information, such as reading a newspaper, playing games, speaking, or facing the display.

Figures 3, 4:
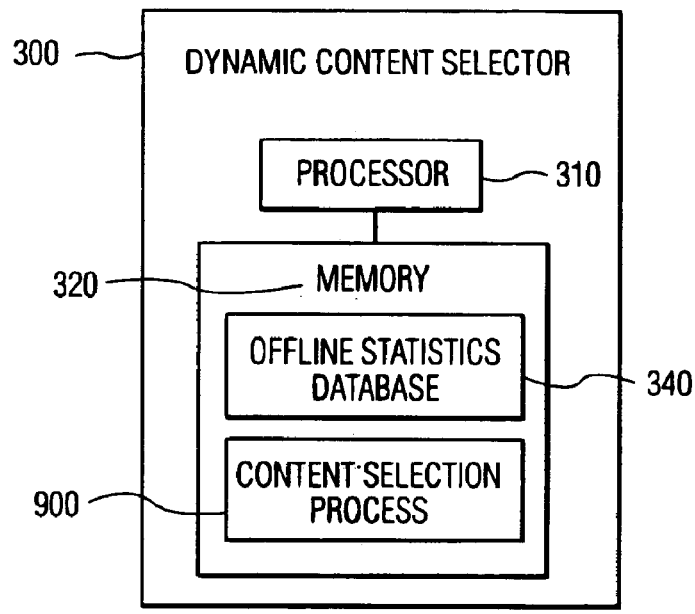
FIG. 3 is a schematic block diagram of the dynamic content selector of FIG. 1.
FIG. 4 is a sample table illustrating an exemplary content database of FIG. 1.

FIG. 3 is a block diagram showing the architecture of an illustrative dynamic content selector 300 in accordance with the present invention. The dynamic content selector 300 may be embodied as a general purpose computing system, such as the general purpose computing system shown in FIG. 3. The dynamic content selector 300 includes certain standard hardware, such as processor 310 and related memory, such as a data storage device 320, as discussed above in conjunction with the audio/visual analyzer 200 (FIG. 2). It is noted that the audio/visual analyzer 200 and dynamic content selector 300 may optionally be integrated using a single general purpose computing system.

As shown in FIG. 3, the data storage device 320 includes an offline statistics database 340, a content selection and driving process 900 and a dynamic content evaluator process 1000. Generally, the offline statistics database 340 contains information relevant to the local environment where the display 110 is installed. For example, the offline statistics database 340 may include historical demographic information on the audience 130 for this location. Thus, the content can be selected on the basis of such historical information in the absence of instantaneous information. In a further variation, the offline statistics database 340 can contain flight, bus or train schedule information if the display 110 is installed in a transportation terminal. In this manner, the dynamic content selection can supplemented using the likely destination of the passengers.

As discussed further below in conjunction with FIG. 9, the content selection and driving process 900 selects advertising or other information to present to the audience 130 based on the current characteristics of the audience or off-line information or both.

FIG. 4 illustrates an exemplary content database 400 that stores information on the advertisements and other information that can be presented to the audience 130. The content database 400 maintains a plurality of records, such as records 405 through 420, each associated with a different content selection. For each content identifier listed in field 430, the content database 400 includes a brief description in field 440, and indicates the corresponding target audience and length in fields 450 and 460, respectively. In this manner, the content selection and driving process 900 can select content appropriate for the current audience based on the information contained in fields 450 or 460 of the content database 400.

Processes

Figure 5:
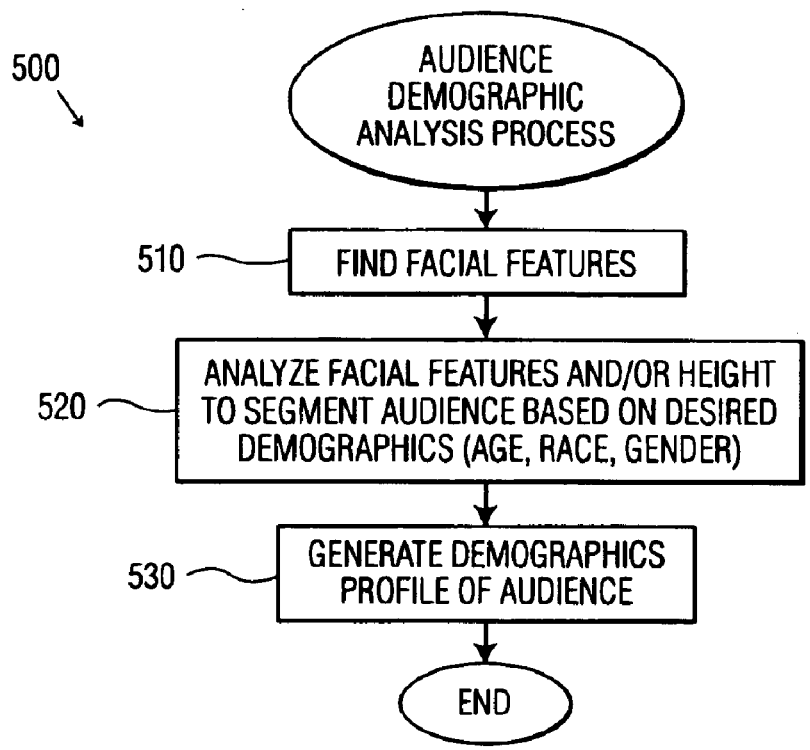
FIG. 5 is a flow chart describing an exemplary audience demographic analysis process employed by the audio/visual analyzer of FIG. 2 and embodying principles of the present invention.

As previously indicated, the audio/visual analyzer 200 executes an audience demographic analysis process 500, shown in FIG. 5, to evaluate to segment the audience based on one or more desired demographics, such as age, race, or gender. As shown in FIG. 5, the audience demographic analysis process 500 receives one or more video images and identifies facial features during step 510. Thereafter, during step 520, the audience demographic analysis process 500 analyzes the facial features or height of the individuals in the image to segment the audience based on one or more desired demographics, such as age, race or gender.

The audience may be segmented on the basis of age using the techniques taught, for example, in U.S. Pat. No. 5,781,650, issued to Lobo et al., incorporated by reference herein. Furthermore, an average distribution of age may be obtained by evaluating height information, in the manner described in Antonio Criminisi et al., "A New Approach to Obtain Height Measurements from Video," Proc. of SPIE, Boston, Mass., Vol. 3576 (Nov. 1–6, 1998), incorporated by reference herein. The audience may be segmented on the basis of race using the skin-tone techniques taught, for example, in Face Guardian: Real-Time Face Verification Software that Recognizes Who You Are, by Keyware Technologies, incorporated by reference herein. The audience may be segmented on the basis of gender using the techniques taught, for example, in Baback Moghaddam and Ming-Hsuan Yang, "Gender Classification with Support Vector Machines," Proc. of the fourth IEEE International Conference on Automatic Face and Gesture Recognition, 306-11, Grenoble, France (March, 2000), incorporated by reference herein. It is noted that gender and age information can also be derived from the height information.

Finally, the audience demographic analysis process 500 generates a profile of the current audience during step 530 before program control terminates.

Figure 6:
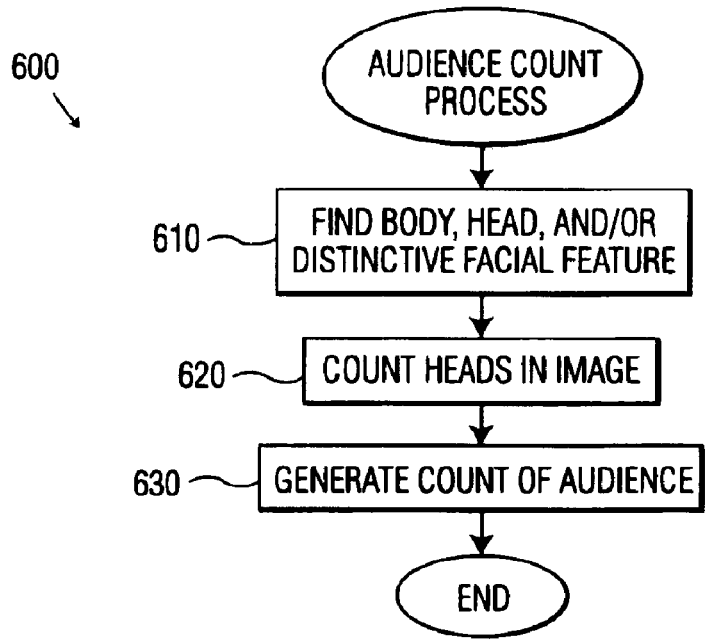
FIG. 6 is a flow chart describing an exemplary audience count process employed by the audio/visual analyzer of FIG. 2 and embodying principles of the present invention.

As previously indicated, the audio/visual analyzer 200 executes an audience count process 600, shown in FIG. 6, to analyze the video image to identify distinctive human features, such as a body, head and facial feature hierarchy, and then count the individuals (e.g., heads) in the image to estimate the size of the audience. As shown in FIG. 6, the audience count process 600 initially receives one or more video images and identifies human bodies, heads, and/or facial features during step 610.

Thereafter, during step 620, the audience count process 600 counts, for example, the heads in the image(s). The body/head count may be performed using the techniques taught, for example, in Patent WO9932959, entitled "Method and System for Gesture Based Option Selection, assigned to the assignee of the present invention, Damian Lyons and Daniel Pelletier, "A Lines Scan Computer vision Algorithm for Identifying Human Body Features," Gesture'99, 85–96 France (1999), Ming-Hsuan Yang and Narendra Ahuja, "Detecting Human Faces in Color Images," Proc. of the 1998 IEEE Int'l Conf. on Image Processing (ICIP 98), Vol. 1, 127–130, (October, 1998); and I. Haritaoglu, D. Harwood, L. Davis, "Hydra: Multiple People Detection and Tracking Using Silhouettes," Computer Vision and Pattern Recognition, Second Workshop of Video Surveillance (CVPR, 1999), each incorporated by reference herein. Finally, the audience count process 600 approximates the size of the audience 130 during step 630, before program control terminates.

Figure 7:
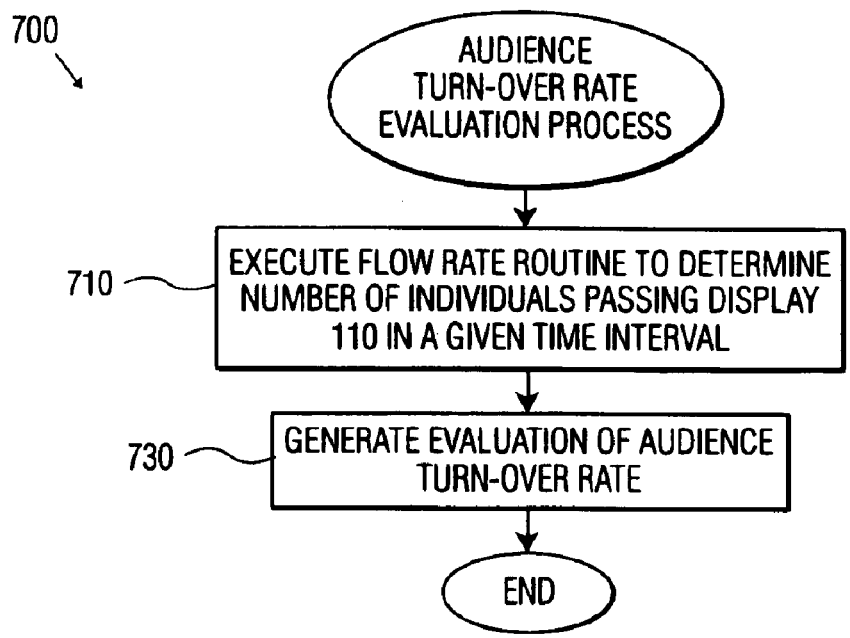
FIG. 7 is a flow chart describing an exemplary audience turn-over evaluation process employed by the audio/visual analyzer of FIG. 2 and embodying principles of the present invention.

As previously indicated, the audio/visual analyzer 200 executes an audience turn-over evaluation process 700, shown in FIG. 7, to generate an evaluation of how quickly the audience is changing. The audience turn-over evaluation process 700 initially executes a flow rate routine to analyze the video information and determine the number of individuals passing before the display 110 in a given time interval. The flow rate routine may be performed using the body/head count techniques taught in the references identified in the previous paragraph to track heads and compute how many people pass the display over time.

Figure 8:
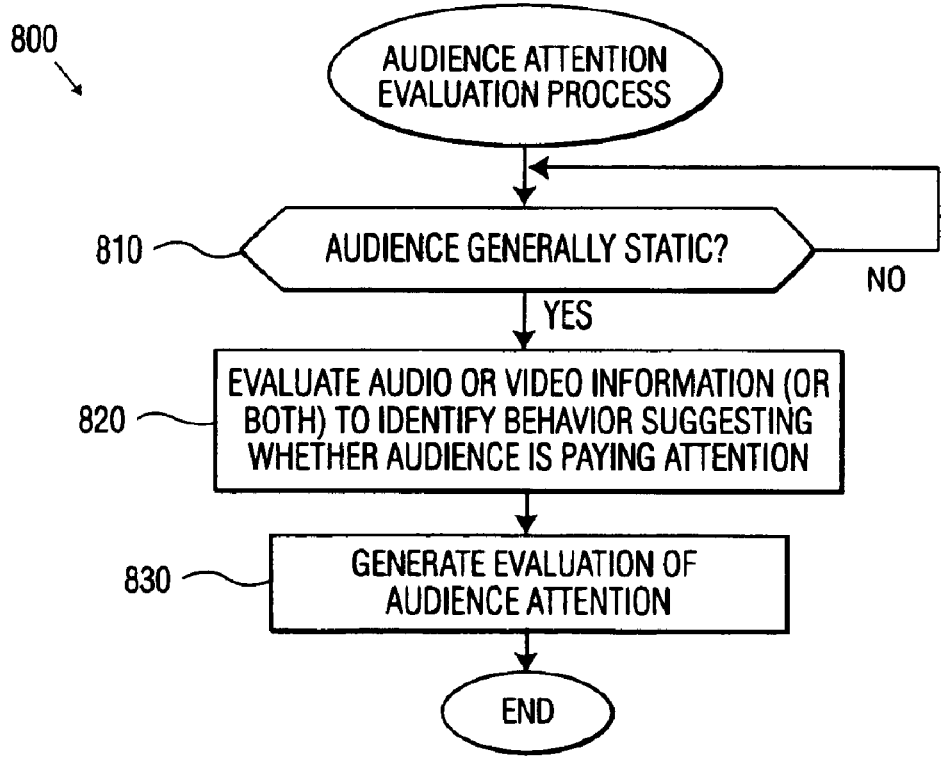
FIG. 8 is a flow chart describing an exemplary audience attention evaluation process employed by the audio/visual analyzer of FIG. 2 and embodying principles of the present invention.

Thereafter, the audience turn-over evaluation process 700 generates an evaluation of the turn-over rate of the audience 130, for example, in terms of number of individuals passing the display As previously indicated, the audio/visual analyzer 200 a executes an audience attention evaluation process 800, shown in FIG. 8, to evaluate the audio or video information, or both, to identify behavior that suggests whether or not the audience is paying attention to the presented advertising or information, such as reading a newspaper, playing games, speaking, or facing the display.

As shown in FIG. 8, the audience attention evaluation process 800 initially performs a test during step 810 to determine if the audience is generally static, based, for example, on the evaluation of the turn-over rate of the audience 130 generated by the audience turn-over evaluation process 700. If it is determined during step 810 that the audience is not generally static, then program control returns to step 810 until the audience is generally static. Thus, the present invention assumes that if the turn-over rate of the audience exceeds a predefined threshold that the audience is not paying sufficient attention to warrant further evaluation.

If, however, it is determined during step 810 that the audience is generally static, then the audience attention evaluation process 800 evaluates the audio or video information (or both) during step 820 to identify. For example, if a person is reading a newspaper, playing a game, speaking, or not facing the display, the person is generally not likely to be paying attention to the presented content.

Thus, the present invention identifies specific behavior that is used to infer whether or not the audience is paying attention to the presented content. For example, the following behavior suggests whether an individual is likely paying attention to the content: facing the display, changing body pose to face the display, changing body expressions (visual, tracking of body features), changing facial expression as the message is displayed (visual), suddenly becoming silent (audio level down), or starting to laugh/concentrate because of the content (audio change).

The audience attention evaluation process 800 can identify facial expressions (such as recognizing a change in facial expression) using the techniques described, for example, in J. F. Cohn and G. S. Katz, "Bimodal Expression of Emotion by Face and Voice," Workshop on Face/Gesture Recognition and Their Applications, 6$^{th}$ ACM International Multimedia Conference (September, 1998), incorporated by reference herein. The audience attention evaluation process 800 can identify Hallucinating Faces, using the techniques described, for example, in S. Baker and T. Kanade, "Hallucinating Faces," 4$^{th}$ Int'l Conf. on Automatic Face and Gesture Recognition (March, 2000), incorporated by reference herein. The audience attention evaluation process 800 can identify embedded faces and facial expressions using the techniques described, for example, in Antonio Colmenarez et al, "Embedded Face and Facial Expression Recognition," Int'l Conf. on Image Processing, Kobe, Japan (1999), incorporated by reference herein.

The audience attention evaluation process 800 can identify Body posture/pose using the techniques described, for example, in D. Anderson, "Occupational Biometrics" John Wiley and Son (2d Edition, 1991), and S. Iwasawa et al., "Real-time, 3D Estimation of Human Body Postures from Trinocular Images," ICCV'99, Workshop on Modeling People, Corfu, Greece (1999), each incorporated by reference herein. The audience attention evaluation process 800 can identify body features (such as head, hands or feet) to detect a change in the body expression using the techniques described, for example, in Damian Lyons and Daniel Pelletier, "A Line-Scan Computer Vision Algorithm for Identifying Human Body Features," Gesture'99 France (1999), incorporated by reference herein.

Finally, the audience attention evaluation process 800 generates an evaluation of the audience attention during step 830 before program control terminates.

Figure 9:
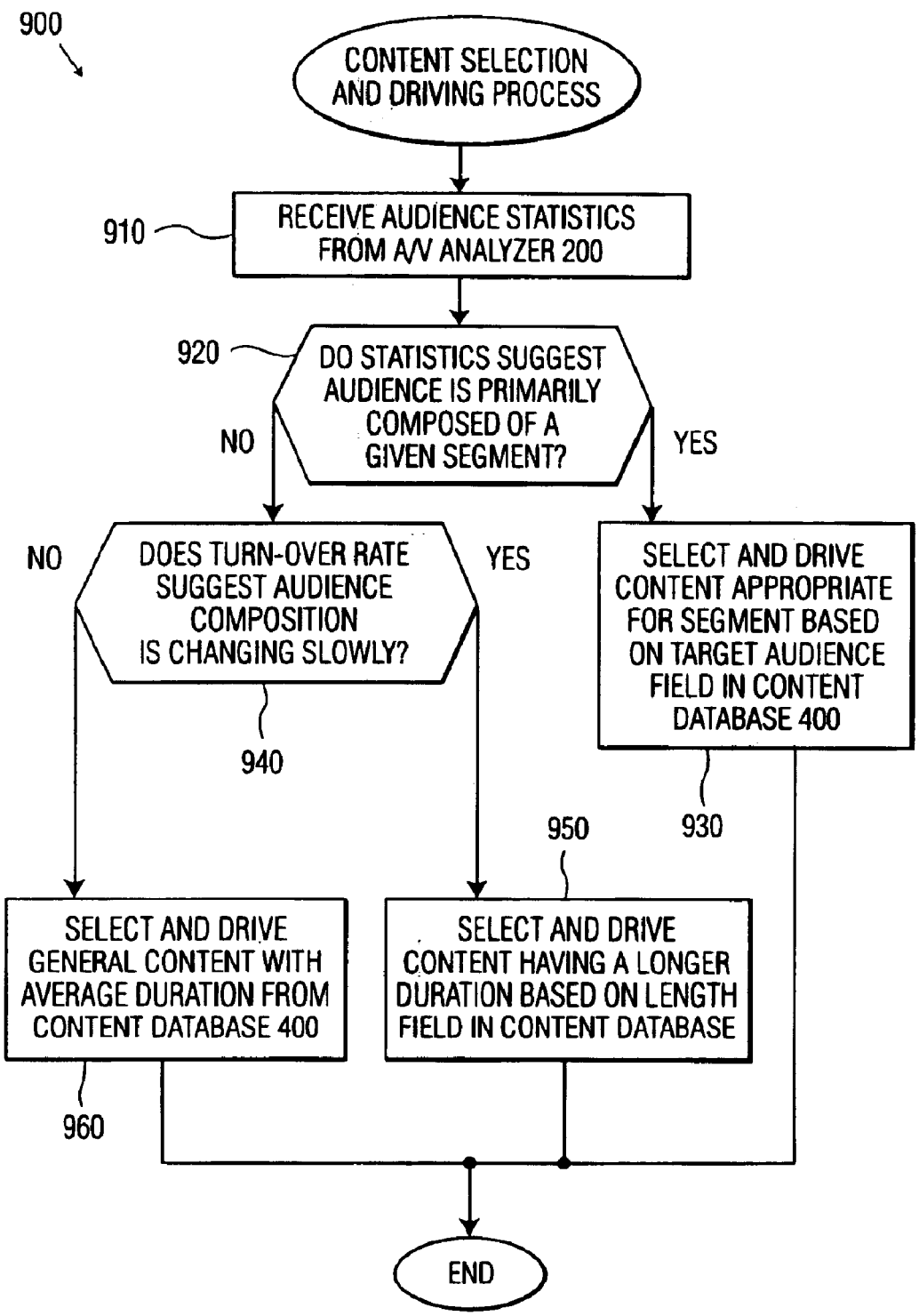
FIG. 9 is a flow chart describing an exemplary content selection and driving process employed by the dynamic content selector of FIG. 3 and embodying principles of the present invention.

As previously indicated, the dynamic content selector 300 executes a content selection and driving process 900, shown in FIG. 9, to select advertising or other information to present to the audience 130 based on the current characteristics of the audience. The content selection and driving process 900 is merely presented to illustrate a rule-based implementation for exemplary rules. In practice, each rule could be adapted for a given application, as would be apparent to a person of ordinary skill in the art.

As shown in FIG. 9, the content selection and driving process 900 initially receives audience statistics from the audio/visual analyzer 200 during step 910. The content selection and driving process 900 then performs a test during step 920 to determine if the statistics suggest that the current audience is primarily composed of a given segment (or demographic). If it is determined during step 920 that the current audience is primarily composed of a given segment (or demographic), then content appropriate for the identified segment is selected during step 930 based on the target audience field 450 in the content database 400. If, however, it is determined during step 920 that the current audience is not primarily composed of a given segment (or demographic), then a further test is performed during step 940 to determine if the turn-over rate suggests that the audience composition is changing slowly.

If it is determined during step 940 that the turn-over rate suggests that the audience composition is changing slowly, then content having a longer duration, as indicated in field 460 of the content database 400 is selected during step 950. If, however, it is determined during step 940 that the turn-over rate does not suggest that the audience composition is changing slowly, then general content having an average duration, is selected during step 960 from the content database 400.

Thereafter, program control terminates. As previously indicated, according to one feature of the present invention, the reporting module 150 receives real-time audience statistics from the audio/visual analyzer 200 and an indication of the selected content from the dynamic content selector 300. The reporting module 150 produces reports indicating the exposure of various population segments to the presented content and the reaction of the audience to the presented content, thereby providing a feedback mechanism that allows the content providers and advertisers to effectively reach the target audience.

Generally, the generated reports can be customized to the needs of a given content provider and can include any statistics produced by the audio/visual analyzer 200 using the audience demographic analysis process 500, audience count process 600, audience turn-over evaluation process 700 and audience attention evaluation process 800, discussed above in conjunction with FIGS. 5 through 8, respectively.

FIG. 10 illustrates an exemplary report 1000 generated in accordance with the present invention indicating the exposure of various population segments to the presented content and the reaction of the audience to the presented content. The illustrative report 1000 includes a plurality of rows, such as rows 1005 through 1013, each associated with a different statistic. In addition, the illustrative report 1000 includes a plurality of columns, such as columns 1051 through 1053, each associated with a different period of time, T. The value of the period, T, can optionally vary in accordance with the length of the content. For example, T could be 30 seconds for content having a length of 5 minutes, or 5 seconds for content having a length of 1 minute.

The manner in which the exemplary statistics set forth in rows 1005 through 1013 are obtained was discussed above in conjunction with FIGS. 5 through 8.

It is to be understood that the embodiments and variations shown and described herein are merely illustrative of the principles of this invention and that various modifications may be implemented by those skilled in the art without departing from the scope and spirit of the invention.

What is claimed is:

1. A method for presenting information to an audience, said method comprising the steps of:

processing at least one of an audio and video signal generated by an audio/visual capture device focused on said audience to determine how quickly said audience is changing over time; and selecting a duration of said presented information based on said determination of how quickly said audience is changing.

2. The method of claim 1, further comprising the step of evaluating how quickly said audience is changing for a given demographic segment.

3. The method of claim 1, wherein information of a shorter duration is selected if a rate of change of said audience is below a predefined threshold.

4. The method of claim 1, wherein information of a longer duration is selected if a rate of change of said audience is above a predefined threshold.

5. A device for presenting information to an audience, said device comprising:

a processor configured to process at least one of an audio and video signal generated by an audio/visual capture device focused on said audience, the processor configured to determine how quickly said audience is changing over time, and the processor configured to control a duration of said presented information based on said determination of how quickly said audience is changing.

6. The device of claim 5 wherein the processor is further configured to evaluate how quickly said audience is changing for a given demographic segment.

7. The device of claim 5, wherein information of a shorter duration is selected if a rate of change of said audience is below a predefined threshold.

8. The device of claim 5, wherein information of a longer duration is selected if a rate of change of said audience is above a predefined threshold.

9. A program segment stored on a computer readable medium for controlling a presentation of information to an audience, said program segment comprising:

a program portion for controlling processing of at least one of an audio and video signal generated by an audio/visual capture device focused on said audience;

a program portion for controlling determination of how quickly said audience is changing over time; and a program portion for controlling a duration of said presented information based on said determination of how quickly said audience is changing.

10. The program segment of claim 9, comprising a program portion for controlling evaluation of how quickly said audience is changing for a given demographic segment.

11. The program segment of claim 9, wherein information of a shorter duration is selected if a rate of change of said audience is below a predefined threshold.

12. The program segment of claim 9, wherein information of a longer duration is selected if a rate of change of said audience is above a predefined threshold.

* * * * *